US010538312B2

(12) United States Patent
Hauber et al.

(10) Patent No.: US 10,538,312 B2
(45) Date of Patent: Jan. 21, 2020

(54) OPERATING AN AIRCRAFT WITH IMPROVED AILERON AND LANDING FUNCTION

(71) Applicant: Liebherr-Aerospace Lindenberg GmbH, Lindenberg/Allgäu (DE)

(72) Inventors: Bernhard Hauber, Scheidegg (DE); Tanja Muenz, Scheidegg (DE)

(73) Assignee: Liebherr-Aerospace Lindenberg GmbH, Lindenberg/Allgäu (DE)

(*) Notice: Subject to any disclaimer, the term of this patent is extended or adjusted under 35 U.S.C. 154(b) by 0 days.

(21) Appl. No.: 16/239,957

(22) Filed: Jan. 4, 2019

(65) Prior Publication Data

US 2019/0135414 A1    May 9, 2019

Related U.S. Application Data

(63) Continuation-in-part of application No. 15/486,901, filed on Apr. 13, 2017, now abandoned, which is a continuation-in-part of application No. 13/803,985, filed on Mar. 14, 2013, now abandoned.

(30) Foreign Application Priority Data

Mar. 16, 2012   (DE) ........................ 10 2012 005 423

(51) Int. Cl.
*B64C 13/28* (2006.01)
*B64C 9/32* (2006.01)
*B64C 9/00* (2006.01)

(52) U.S. Cl.
CPC .............. *B64C 13/28* (2013.01); *B64C 9/323* (2013.01); *B64C 2009/005* (2013.01)

(58) Field of Classification Search
CPC ....... B64C 9/04; B64C 9/06; B64C 2009/005; B64C 13/28
See application file for complete search history.

(56) References Cited

U.S. PATENT DOCUMENTS

| 2,402,118 | A | 6/1946 | Ashkenas |
| 2,583,405 | A | 1/1952 | Youngman |
| 2,682,381 | A | 6/1954 | Crandall |
| 12,977,966 | | 3/1961 | Davidson et al. |
| 2,978,204 | A | 4/1961 | Davidson |
| 2,978,207 | A | 4/1961 | Davidson |
| 3,070,334 | A | 12/1962 | Ebdon |
| 3,155,346 | A | 11/1964 | Charlton et al. |
| 3,469,807 | A | 9/1969 | Morris, Jr. |
| 3,478,988 | A * | 11/1969 | Roed ........................ B64C 3/58 244/211 |
| 3,539,133 | A | 11/1970 | Robertson et al. |
| 3,614,028 | A | 10/1971 | Kleckner |
| 3,659,810 | A | 5/1972 | Robertson |

(Continued)

OTHER PUBLICATIONS

Segawa, Hidehiro: Optimum Flap Angles for Roll Control on Wings with Multiple Trailing-Edge Flaps; 2007, North Carolina State University.

*Primary Examiner* — Richard R. Green
*Assistant Examiner* — Michael A. Fabula
(74) *Attorney, Agent, or Firm* — Dilworth & Barrese, LLP

(57) ABSTRACT

An aircraft having two separate landing flaps on each wing which are actuated together in a landing mode or function, and wherein the outer flap of each wing is also separately actuated in an aileron mode or function separate from the inner flap.

4 Claims, 4 Drawing Sheets

(56) References Cited

U.S. PATENT DOCUMENTS

| | | |
|---|---|---|
| 4,049,219 A | 9/1977 | Dean et al. |
| 4,120,470 A | 10/1978 | Whitener |
| 2,580,841 A | 3/1979 | Ross |
| 4,146,200 A | 3/1979 | Borzachillo |
| 4,180,222 A | 12/1979 | Thornburg |
| 4,479,620 A | 10/1984 | Rogers et al. |
| 4,485,992 A | 12/1984 | Rao |
| 4,796,192 A | 1/1989 | Lewis |
| 5,842,666 A | 12/1998 | Gerhardt et al. |
| 6,729,579 B1 | 5/2004 | Becker |
| 7,004,428 B2 | 2/2006 | Tracy et al. |
| 7,243,881 B2 | 7/2007 | Sakurai et al. |
| 7,708,231 B2 | 5/2010 | Lacy et al. |
| 2006/0169848 A1 | 8/2006 | Libby |
| 2009/0292405 A1 | 11/2009 | Najmabadi et al. |
| 2014/0097292 A1 | 4/2014 | Hauber et al. |
| 2017/0283041 A1 | 10/2017 | Hauber et al. |

\* cited by examiner

```
┌─────────────────────────────────────┐
│  POSITIONING   GEAR  BOXES  200     │
└─────────────────┬───────────────────┘
                  │
┌─────────────────┴───────────────────┐
│ LOWERING BOTH FLAPS 30,40 IN LANDING MODE │
└─────────────────┬───────────────────┘
                  │
┌─────────────────┴───────────────────────────┐
│ ACTIVATING OUTER FLAPS 40 WITH RESPECT       │
│ TO EACH OTHER WHILE MAINTAINING INNER        │
│ FLAPS 30 STATIONARY IN AILERON MODE          │
└─────────────────┬───────────────────────────┘
                  │
┌─────────────────┴───────────────────┐
│ OMITING SEPARATE AILERON FLAP        │
│ FROM EACH WING 10                    │
└─────────────────────────────────────┘
```

FIG 4

OPERATING AN AIRCRAFT WITH IMPROVED AILERON AND LANDING FUNCTION

BACKGROUND OF THE INVENTION

The present invention relates to an aircraft having at least one flap arranged at the wing of the aircraft and having at least one first drive unit for actuating the flap as a landing flap and a first control unit for controlling the first drive unit when the aircraft is in a landing mode of operation.

It is known from the prior art to completely separate the aileron function and the high-lift function, i.e. the drives of the landing flaps, from one another. Such a system known from the prior art is shown in FIG. 2. A wing of an aircraft is marked by the reference numeral 10.

Different actuators 20 for adjusting the inner landing flap 30 and the outer landing flap 40 are located in the wing. One aileron 50 which is operated by one or more actuators 52, 54 is furthermore provided in the region of the outer edge of the wing.

A PCU, i.e. a power control unit, which represents a central drive unit is marked by the reference numeral 100. It is thus generally known from the prior art to implement the high-lift functions, i.e., in particular the adjustment of the landing flaps, by central drive units and/or also by drive units between the panels or the landing flaps. A further possibility is to arrange individual drives at the landing flaps.

The arrangement in accordance with FIG. 2 is the same for both wings, i.e. the structure is symmetrical with the central PCU 100 which supplies both wings. In FIG. 2 an active differential gear box which is in drive communication with the PCU 100 is marked by the reference numeral 200.

The structure known from FIG. 2 admittedly represents a very reliable system for operating the high-lift systems and the aileron; however it is comparatively complex and therefore heavy, which is unwanted.

SUMMARY OF THE INVENTION

It is therefore the underlying object of the present invention to further develop an aircraft of the initially named kind such that it has a smaller aircraft weight than known designs.

This object is achieved by an aircraft having the features herein. According to the present invention the aircraft comprises at least one second drive unit which is or comprises an active differential gear box for actuating the flap as an aileron and a second control unit for controlling the second drive unit when the aircraft performs an aileron function.

Provision is therefore made in accordance with the invention that at least one flap takes over the function of an aileron at least in one flight mode, preferably during the cruise flight, and that the same flap takes over the function of a landing flap in case that the aircraft is in its landing mode.

If the flap is needed for the aileron function the flap is driven by or via the active differential gear box which is controlled by a second control unit.

If the same flap is needed for the landing of the aircraft the flap is driven by the first drive unit, the operation of which is controlled by the first control unit.

If the pilot thus actuates the corresponding functional unit in the cockpit, the flap is adjusted by the second drive unit to implement the desired aileron function.

The active differential gear box may include at least one drive unit, for example an electrical or hydraulic drive unit, such as a motor, preferably in the aircraft wing. In one mode of operation the flap is used as aileron and in that case is driven by or via the active differential gear box, in particular during cruise flight. The operation of the active differential gear box is controlled by the second control unit which may be part of the active differential gear box or which may be located at another position of the aircraft.

If the second control unit is activated by the pilot, the active differential gear box is started and operates the flap as aileron.

If the first control unit is activated by the pilot, the first drive unit is started and operates the flap as landing flap. The first drive unit could be the PCU, i.e. the Power control unit which is shown in FIG. 2 with reference numeral 100.

The first and second control unit may be separate units or may be incorporated with one single unit.

The present invention unveils the advantage that redundancies can be saved, that ailerons as such can be saved and that, optionally, the drive of the ailerons can be made simpler such as by the omission of one or more aileron actuators.

Generally, one or more flaps can be used for carrying out the aileron function.

Provision is made in a preferred embodiment of the invention that a plurality of flaps are arranged in the aircraft wing and that the named flap, which is controlled to take over the aileron function is the outer flap or, in the case of more than two flaps, the outermost flap, i.e. the one arranged toward the wing tip.

It is conceivable that the inner flap or all inner flaps are stationary on this actuation of the flap used as an aileron. As outlined above the drive unit in that case is or comprises an active differential gear box.

It is conceivable to fully dispense with ailerons, i.e., with flaps which are adapted to perform the aileron function only.

It is pointed out that the aileron function can be taken over by one flap of the wing or also by a plurality of flaps of the wing.

A weight reduction at aircraft level results due to the association of the high-lift function with the aileron function and thus the possible partial or complete saving of redundancies/actuators at ailerons.

The present invention furthermore relates to a method of operating an aircraft having at least one flap arranged at the wing of the aircraft and having at least one first drive unit for adjusting the flap in the landing mode of the aircraft, wherein the aircraft furthermore has at least one first control unit which controls the first drive unit of the aircraft when the aircraft is in the landing mode of operation, wherein the aircraft comprises at least one second drive unit which is or comprises an active differential gear box and at least one second control unit which controls the aileron function of the aircraft and wherein the second drive unit and the second control unit are activated when the aircraft performs an aileron function.

It is conceivable that the aircraft has a plurality of flaps and that the outer flap or, in the case of more than two flaps, the outermost one of the flaps is adjusted for carrying out the aileron function.

It is furthermore conceivable that on the carrying out of the aileron function by means of one or more flaps the inner landing flap or the inner landing flaps are stationary per wing, i.e. are not adjusted. Those flap or flaps are only used for a highlift functionality.

The method in accordance with the invention thus relates to the fact that a weight reduction is achieved by the omission of ailerons, i.e. of flaps which perform the aileron function only (and no highlift function which is necessary in the landing mode) and/or by the reduction of the number of actuators or drive units per aileron.

Provision is made in a further embodiment of the invention that with one and the same type or model of aircraft the number of ailerons is reduced, for example, from two ailerons to one aileron or that the number of drive units is reduced from two drives units to one drive unit per aileron. It is equally conceivable that an aileron is wholly omitted so that only landing flaps are available for carrying out the aileron function.

BRIEF DESCRIPTION OF THE DRAWINGS

Further details and advantages of the invention will be explained in more detail with reference to an embodiment shown in the drawing. There are shown:

FIG. 4: a flow chart of the method according to the present invention.

DESCRIPTION OF THE PREFERRED EMBODIMENTS

Figure 1:
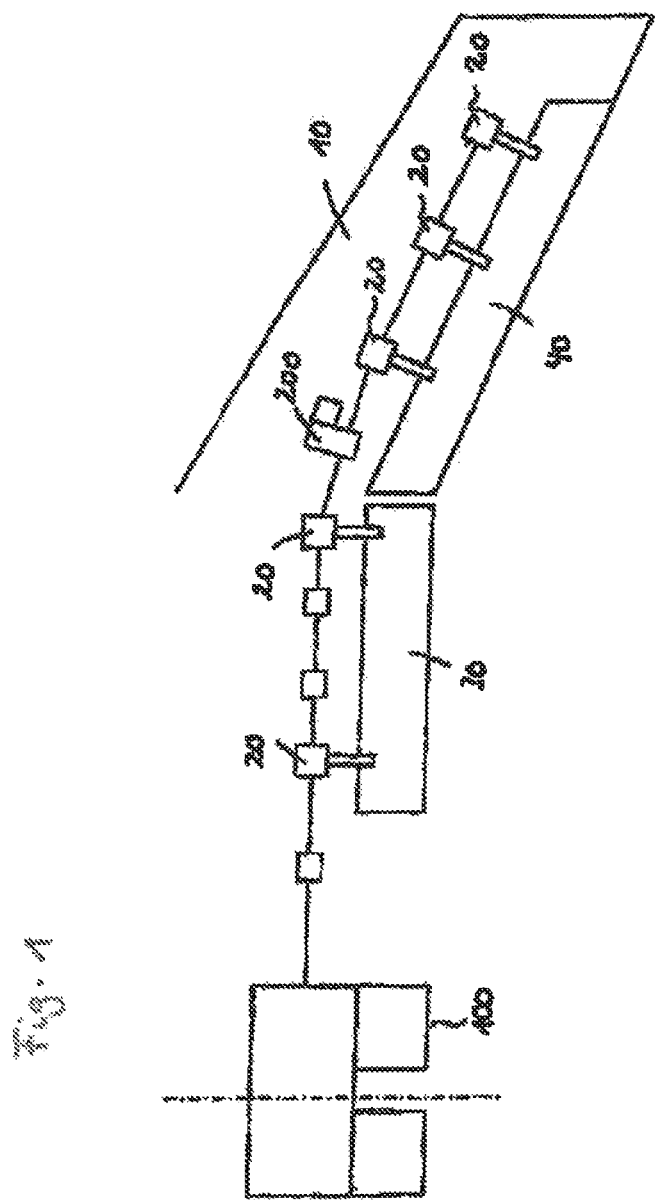
FIG. 1: a schematic view of a wing with only one landing flap and with one flap which is used as aileron and as landing flap.
Figure 2:
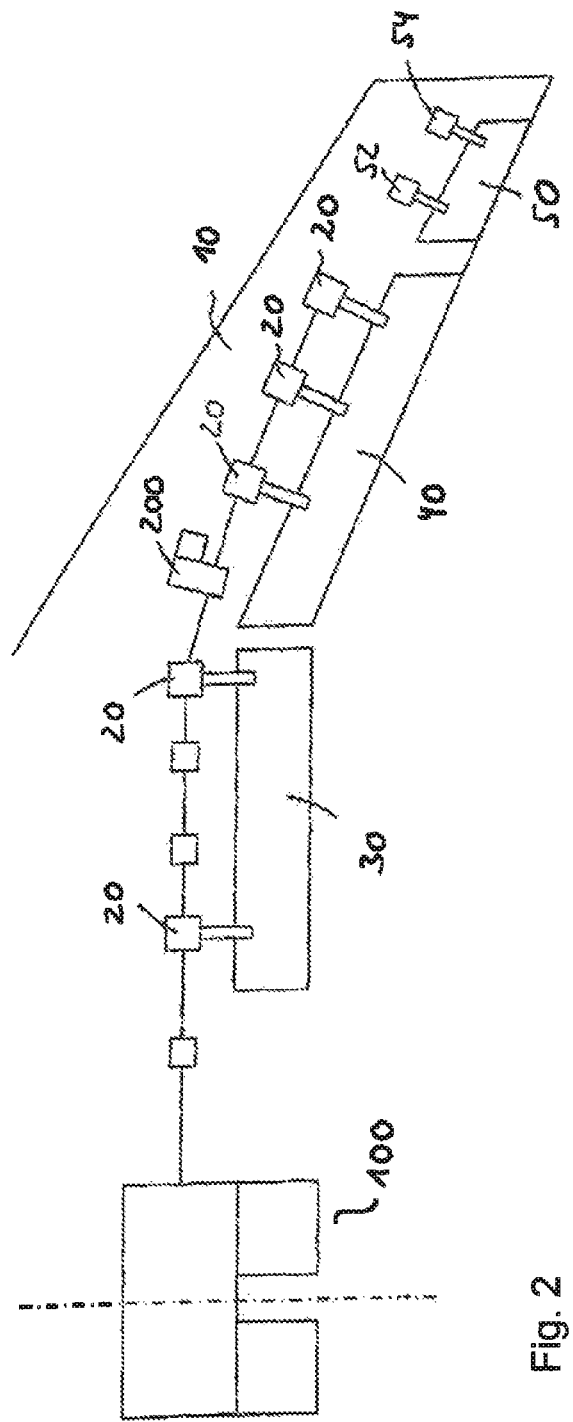
FIG. 2: a schematic view of arrangements of landing flaps and ailerons in a wing known from the prior art.

FIG. 1 shows a wing 10 of an aircraft comprising one landing flap 30 (inboard) and one flap 40 (outboard) which may be used—depending on the flight mode—as landing flap or as aileron.

Reference numeral 100 is the first drive unit according to the present invention and is a power control unit PCU which may be located in the fuselage of the aircraft. The PCU is controlled by a first control unit (not shown). It is activated in the landing mode of the aircraft. In this case both flaps 30, 40 are used as landing flaps.

The movement of the flaps 30, 40 is performed by means of actuators 20 which are driven by a transmission which is driven by the PCU 100. As shown in FIG. 1 the transmission runs through the active differential gear box 200.

In case of cruise flight, the landing flap 30 remains stationary. The flap 40 in that case is used as aileron. In the aileron mode the flap 40 is driven by the second drive unit 200 which an active differential gear box and not by the PCU 100. The control of the operation of the second drive unit is performed by means of a second control unit (not shown). The transmission power of the active differential gear box 200 is transmitted to the actuators 20 of the flap 40 (and not to the actuators 20 of the landing flap 30) in order to perform the aileron function.

An improvement in the weight and cost balance is achieved by the present invention as well as of the safety of the high-lift system of an aircraft. The second drive unit can be arranged in the aircraft wing or also at a central site in the fuselage of the aircraft.

The second drive unit can comprise an electrical or hydraulic drive for the partial or complete taking over of the aileron function. This in particular applies during cruise flight.

Where possible, it is conceivable in particular to use the outer landing flap as the aileron which is actuated by the second drive unit in the wing (high-lift function). The inwardly offset or inner landing flap can be stationary in this respect.

This configuration allows the saving of redundancies/actuators at the aileron by using already present drive units in the wing for taking over the partial or complete aileron function. As stated, in systems with a plurality of ailerons, one aileron can possibly be completely saved.

A weight reduction results due to the association of the high-lift function with the aileron function and thus the possible partial or complete saving of redundancies/actuators at the aileron.

The arrangements in accordance with the invention shown in FIG. 1 are preferably present in both wings. The arrangement is preferably mirror symmetrical.

Figure 3:
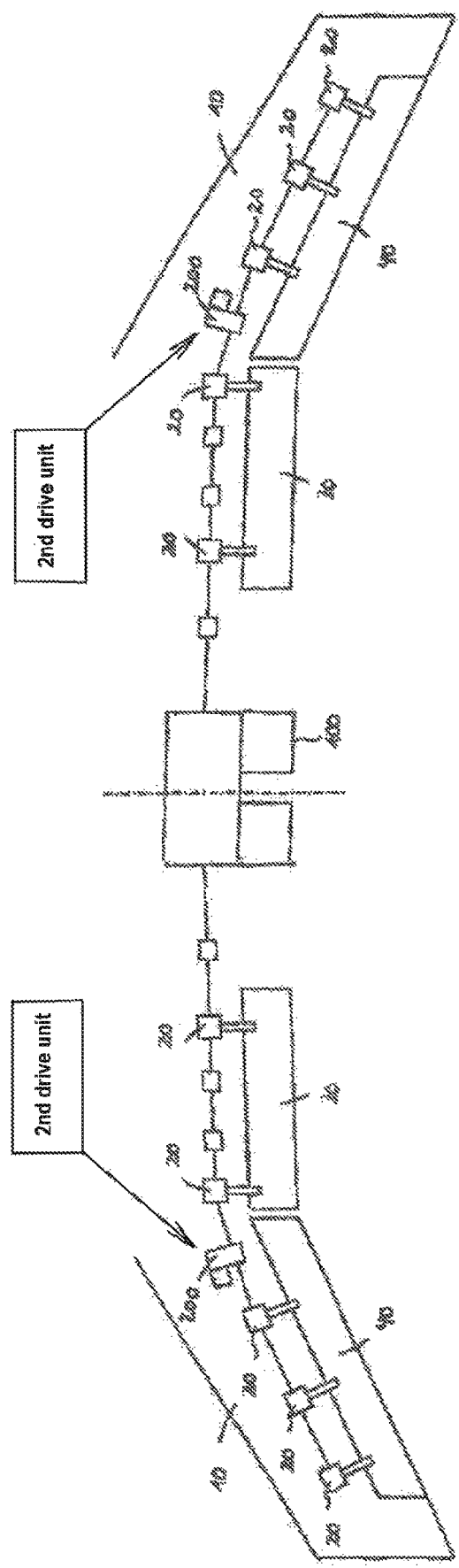
FIG. 3: a schematic view similar to FIG. 1 and showing two wings each having only one landing flap and one flap which is used as aileron and as landing flap.

FIG. 3 shows two wings in which the first drive unit 100 is shared by the flap systems of both wings for synchronized movement, i.e., in landing mode. Furthermore, in aileron mode, the outer flaps 40 are individually moved by the respective second drive units coupled thereto through the respective differential gear boxes 200 as shown. The same control surface 40 functioning as a landing flap during landing also carries out aileron function during cruising or flight. This is achieved by connecting the control surface or flap 40 through the respective differential gear box 200 to an additional actuator or drive unit (as shown in FIG. 3) that is independent from the main actuator or first drive unit 100, and decoupling the outer flaps 40 from the first drive unit 100 (and inner flaps 30) during cruising.

Upon activation for landing mode, the first drive unit 100 and respective inner flaps 30 are coupled to the outer flaps 40 through the respective differential gear boxes 200 which also de-couple the respective second drive units on each wing from the outer flaps 40. Each outer flap 40 is mounted upon the respective wing to be rotatable either upwardly or downwardly through the respective second drive units, so the aircraft can turn upon cruising by raising one of the outer flaps 40 and lowering the other of the outer flaps 40.

What is claimed is:
1. An aircraft having
two wings (10),
a pair of inner and outer landing flaps (30, 40) arranged on each wing (10) of the aircraft,
a first drive unit (100) arranged to lower both said flaps (30, 40) of both pairs in a landing mode,
actuators (20) arranged for moving both said flaps (30, 40) of both pairs in response to said first drive unit (100),
transmissions arranged to be driven by said first drive unit (100) and to drive the actuators (20),
active differential gear boxes (200) on each wing (10) through which the transmissions run from the inner flaps (30) to the outer flaps (40) and dividing the transmissions between the flaps (30, 40), with inner transmission sections arranged for activating the inner flaps (30) and outer transmission sections arranged for activating the outer flaps (40),
second drive units arranged to adjust the outer flaps (40) individually or differentially with respect to one another during a cruising flight mode to provide roll or aileron functionality while the inner flaps (30) remain stationary, said second drive units acting only on the outer sections of the transmissions through the active differential gear boxes (200) and arranged in the respective aircraft wings (10) or fuselage of the aircraft, and
only said two flaps (30, 40) are positioned on each wing (10) which is devoid of a separate aileron flap.
2. The aircraft of claim 1, wherein said respective active differential gear boxes (200) are configured to decouple said outer flaps (40) from said respective inner flaps (30) and first drive unit (100) during cruising.

3. A method of operating an aircraft having two wings (10) and a pair of inner and outer landing flaps (30, 40) arranged on each wing (10) of the aircraft, comprising
- positioning active differential gear boxes (200) along transmissions between the inner and outer flaps (30, 40) of each pair to divide the transmission between the flaps (30, 40), with inner transmission sections activating the inner flaps (30) of each pair and outer transmission sections activating the outer flaps (40) of each pair,
- lowering both said flaps (30, 40) in both pairs in a landing mode from a first drive unit (100) coupled to both said flaps (30, 40) in both pairs through transmission drives by the first drive unit (100) and driving actuators (20) positioned at said respective flaps (30, 40),
- activating the outer flaps (40) of each pair in aileron mode individually or differentially with respect to one another during a cruising mode to provide roll or aileron functionality while the inner flaps (30) of each pair remain stationary, by second drive units acting only on the outer transmission sections through the differential gear boxes (200) and being arranged in the respective aircraft wings (10) or fuselage of the aircraft, and
- omitting a separate aileron flap from each wing (10), so that turning the aircraft during cruising is only effected by activating the outer flaps (40) of each wing (10).

4. The method of claim 3, comprising decoupling said first drive unit (100) and respective inner flaps (30) from said outer flaps (40) during cruising.

\* \* \* \* \*